(12) United States Patent
Van Rooyen et al.

(10) Patent No.: US 8,322,008 B2
(45) Date of Patent: Dec. 4, 2012

(54) METHOD OF REPAIRING A METALLIC ARTIFACT

(75) Inventors: Corney Van Rooyen, Rayton (ZA); Herman Burger, Pretoria (ZA); Philip Doubell, Pretoria (ZA)

(73) Assignee: Eskom Holdings Soc Ltd., Sandton, Guateng Province (ZA)

( * ) Notice: Subject to any disclaimer, the term of this patent is extended or adjusted under 35 U.S.C. 154(b) by 56 days.

(21) Appl. No.: 13/140,736

(22) PCT Filed: Dec. 10, 2009

(86) PCT No.: PCT/IB2009/055651
§ 371 (c)(1),
(2), (4) Date: Jun. 17, 2011

(87) PCT Pub. No.: WO2010/070548
PCT Pub. Date: Jun. 24, 2010

(65) Prior Publication Data
US 2011/0247188 A1 Oct. 13, 2011

(30) Foreign Application Priority Data
Dec. 18, 2008 (ZA) .................................. 2008/10686

(51) Int. Cl.
*B23P 6/00* (2006.01)

(52) U.S. Cl. ............... 29/402.01; 29/402.04; 29/402.05; 29/402.07; 29/402.16; 29/402.18; 29/458; 29/527.1

(58) Field of Classification Search ................. 29/81.15, 29/402.01, 402.04, 402.05, 402.07, 402.13, 29/402.16, 402.18, 402.19, 458, 527.1, 527.2
See application file for complete search history.

(56) References Cited

U.S. PATENT DOCUMENTS

| | | | |
|---|---|---|---|
| 6,889,889 B2 * | 5/2005 | Offer et al. ..................... | 228/119 |
| 2003/0217452 A1 * | 11/2003 | Talwar et al. .............. | 29/402.14 |

* cited by examiner

*Primary Examiner* — Jermie Cozart
(74) *Attorney, Agent, or Firm* — Colin P. Cahoon; Amanda K. Jenkins; Carstens & Cahoon, LLP

(57) ABSTRACT

A method of repairing a metallic artefact (40) with an open defect in or on a metallic surface or substrate of the metallic artefact includes cold forging the open defect to close the open defect and thereafter laser cladding the cold forged defect with a plurality of laser clad beads (44) applied to the metallic surface or substrate to cover the cold forged defect with a cladded metal layer. Advantageously, in-situ repair of fluid-filled vessels, pipes or the like is made possible by the repair method, in some instances eliminates the need to shut equipment down thereby reducing downtime and the cost associated with lost production.

14 Claims, 2 Drawing Sheets

METHOD OF REPAIRING A METALLIC ARTIFACT

THIS INVENTION relates to repair of metallic artefacts. In particular, the invention relates to a method of repairing a metallic artefact.

Conventional arc welding repair procedures cannot be applied on wet metallic surfaces since the presence of moisture on a metallic surface to be repaired results in arc instability and induces porosity in the weld metal. Arc welding is thus not suitable in particular for in-situ repair of leaking metallic vessel walls since the risk of a melt through perforation of the metallic vessel wall is unacceptable. The ability to seal leaking cracks in metallic artefacts, e.g. leaking cracks in water-filled vessels, or leaking cracks in vessels holding a compressed gas, would however be very desirable as such an ability obviates the need to drain the vessel or to vent the vessel before effecting repairs. As will be appreciated, the need to drain or vent a vessel for repair purposes would impose downtime on a process employing the vessel, which can be extremely costly, particularly in large process facilities such as petrochemical or bulk chemical facilities, bulk power generation facilities and the like.

According to the invention, there is provided a method of repairing a metallic artefact with an open defect in or on a metallic surface or substrate of the metallic artefact, the method including cold forging the open defect to close the open defect; and laser cladding the cold forged defect with a plurality of laser clad beads applied to the metallic surface or substrate to cover the cold forged defect with a cladded metal layer.

In this specification, the term "open defect" refers to any defect defining an open or recessed area with a boundary, such that cold forging of the open defect forces opposed but adjacent areas of the boundary together thereby to close the defect on the outer surface. In particular, the term "open defect" includes cracks such as stress corrosion cracks, pinholes, pores, small holes and the like.

Although the method of the invention is in principle applicable to in-situ repair of any metallic artefact which can be subjected to laser cladding, it is believed that the method of the invention will find particular application in the repair of metal vessels filled with non-flammable fluids, e.g. water-filled vessels or pressurised tanks holding a gas, and even more particularly to such vessels having cracks.

The metallic artefact may be a steel or stainless steel or any other metal artefact, e.g. a stainless steel water-filled vessel. The metallic artefact may be stationary and may be repaired in situ without removing the metallic artefact from where it is located in use or without removing the metallic artefact from service.

In one embodiment of the method of the invention, the metallic artefact is a 304L stainless steel water-filled vessel or a component of such a vessel with the open defect being a stress corrosion induced crack in a wall of the vessel or in said component of the vessel.

The metallic artefact may hold or carry a fluid behind the open defect during performance of the method. The fluid may be at a pressure of more than 0.1 bar(g), even more than 1 bar(g), even more than 1.5 bar(g), e.g. about 2 bar(g). Typically, the pressure will not be higher than 3 bar(g).

Cold forging of the open defect may be in the form of, or may include hammer peening of the open defect. Typically, an air hammer with a rounded steel tip is used for the hammer peening.

The laser clad beads are typically parallel and overlapping thereby to form the cladded metal layer. Preferable, laser clad beads are deposited at speeds that range between 0.3 m and 3 m per minute, with a bead overlay of 50% to 70%, to ensure that a continuous cladded metal layer is formed.

The chemical composition of the cladded metal layer may be different from that of the metallic surface or substrate of the metallic artefact. With optimized process parameters it is possible to obtain minimal dilution of the clad beads by the metallic surface or substrate.

When the defect is elongate, e.g. in the form of a crack, the clad beads may be applied transverse, e.g. perpendicular, to a longitudinal axis or direction of the elongate defect. Typically, the cladded metal layer covers the entire defect and extends beyond the limits of the defect, so that on all sides of the defect there is a zone where the cladded metal layer is between the defect and uncladded substrate.

The cladded metal layer may still show an open defect, e.g. a leaking pore, after laser cladding. The method may then include cold forging the open defect in the cladded metal layer which is a first cladded metal layer, and applying a further cladded metal layer by means of laser cladding over at least part of the first cladded metal layer.

The laser cladding generates a melt pool. The method may include making the viscosity of the melt pool sufficiently high by limiting the size of the melt pool and by ensuring a sufficiently high solidification rate, to contain the fluid under pressure.

When fluid is escaping or leaking through the open defect, the hammer peening must close the open defect to reduce fluid leakage to such a level that laser cladding can be effected. It is however not necessary entirely to stop the leakage, as laser cladding can still be done when some fluid, e.g. water, is flowing over the area to be laser cladded or some fluid, e.g. a non-combustible gas, is still escaping through the cold forged defect.

The invention will now be described, by way of example, with reference to the accompanying drawings in which FIG. 1 shows a schematic diagram of laser cladding equipment;

Figure 1:
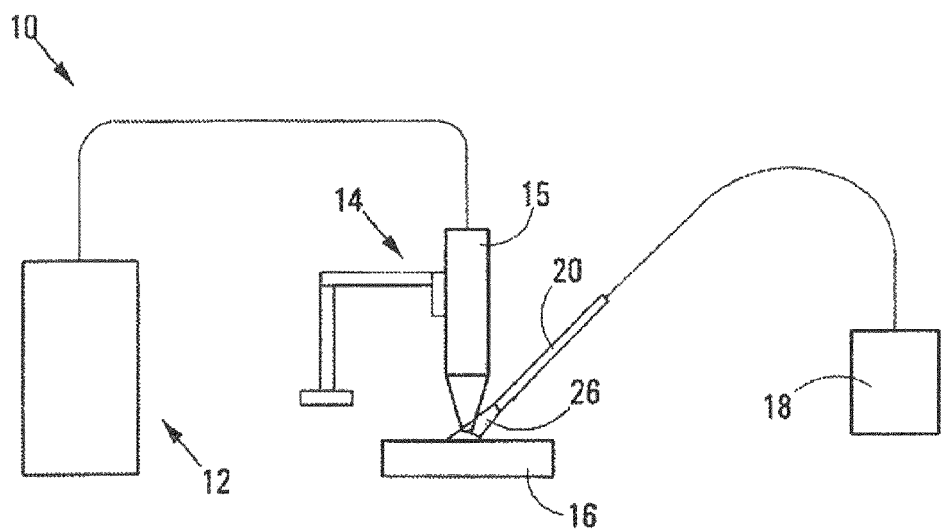

Referring to FIG. 1 of the drawings, reference numeral 10 generally indicates laser cladding equipment suitable for use in the method of the invention. The equipment 10 includes a laser source 12 feeding a laser processing head 15 carried by a robot 14. A powder feeder 18 supplies a powder nozzle 20 with a consumable metallic powder for laser cladding a substrate 16.

Figure 2:
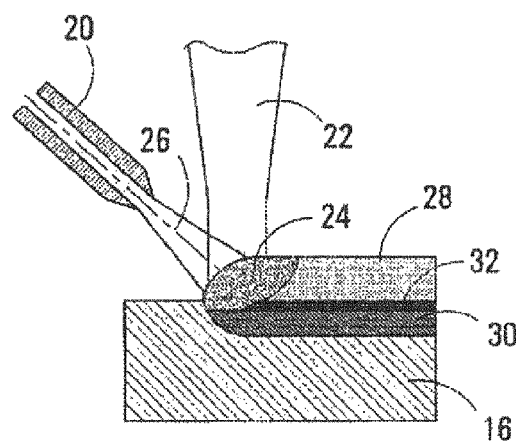
FIG. 2 shows a schematic diagram of a laser cladding process.

Laser cladding can be performed with a $CO_2$, Nd:YAG, diode or Yb:YAG fibre lasers. Referring to FIG. 2 of the drawings, a laser beam 22 is defocused to a spot size of 1 mm to 6 mm on a surface of the substrate 16. A shallow melt pool 24 is generated on the surface of the substrate 16. The consumable metallic powder, generally indicated by reference numeral 26, is injected into the melt pool 24 by means of the powder nozzle 20. The consumable metallic powder 26 is melted and solidifies as a metallurgically bonded layer 28 on the substrate 16. Typically, the composition of the cladded layer 28 will be different from that of the substrate 16 and minimal dilution of the cladded layer 28 by the substrate 16 will occur. Beads are deposited at speeds that range typically between 0.3 m to 3 m per minute. Subsequent beads are deposited with a bead overlay of 50% to 70%. A continuous layer is thus formed. The thickness of the cladded layer 28 is determined by a combination of laser power density, powder feed rate, the cladding speed and the bead overlap. These factors also play a role in the degree to which the cladded layer 28 is diluted by substrate material and hence the final chemistry of the cladded layer 28.

The powder nozzle 20 can be off axis with respect to the laser beam 22 or co-axial with respect to the laser beam 22 and more than one powder nozzle 20 may be used, e.g. three or four powder jet configurations.

Powder is fed from the powder feeder 18 to the nozzle 20 by means of a carrier gas which is typically helium or argon at a flow rate of 2 l to 15 l per minute. Argon, argon with 5% hydrogen or helium can be blown additionally to avoid oxidation of the weld bead, typically at 5 l to 15 l per minute.

The cladded layer 28 includes a heat-affected zone 30 and a mixing zone 32 where most of the dilution of the cladded layer 28 by the metal of the substrate 16 occurs.

Figure 3:
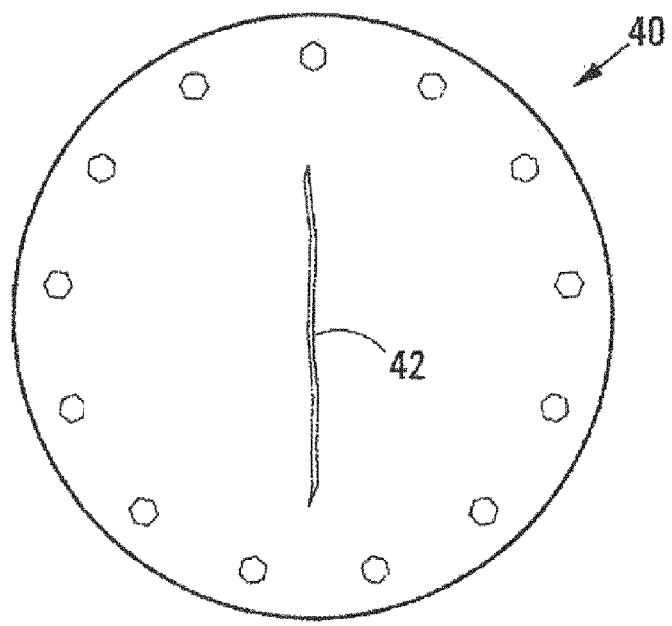
FIG. 3 shows a front view of a metal flange of a water-filled vessel undergoing in-situ crack repair using the method of the invention.

Referring to FIG. 3 of the drawings, a metal flange of a 304L stainless steel water-filled vessel, which is undergoing in-situ crack repair using the method of the invention, is generally indicated by reference numeral 40. The vessel (not shown) to which the flange 40 is bolted is filled with water, with the pressure of the water behind the flange 40 being about 2 bar. Water escapes slowly through a crack 42 in the flange 40. The crack 42 is elongate and vertically extending and is shown exaggerated for clarity.

In order to repair the crack 42, the crack 42 is cold forged by means of hammer peening, forging opposed vertically extending edges of the crack 42 closer together to close the crack 42 in an outer surface of the flange 40. Although preferable, it is not essential that the hammer peening entirely stops the leakage of water, as laser cladding can still be done when some liquid is flowing over the area to be laser cladded.

Figure 4:
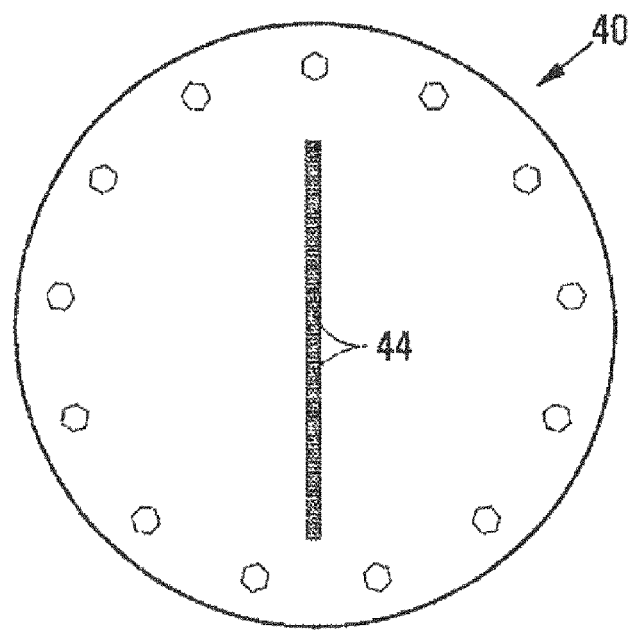
FIG. 4 shows the repaired metal flange of FIG. 3.

The crack 42 is then cladded with successive clad beads 44, using laser cladding equipment such as the laser cladding equipment 10 shown in FIG. 1, and a laser cladding process such as the laser cladding process illustrated in FIG. 2. The beads 44 start above or below the crack 42 and end below or above the crack 42, as shown in FIG. 4 of the drawings. The clad beads 44 are also significantly longer than the width of the crack 42 so that the cladded metal layer formed by the clad beads 44 covers the entire crack 42 ensuring that the crack 42 is surrounded on all sides by the cladded metal layer. A suitable tool path must thus be programmed for the robot 14 to cover the entire crack 42. The crack can either be horizontal, vertical or at any orientation.

A potential problem could arise where cracks in the substrate 16, e.g. the flange 40, are in close proximity to each other. In this case it is possible that the sealing of one crack will aggravate the leak from an adjacent crack to such an extent that it would not be possible to seal the adjacent crack. It should however be possible to devise a strategy comprising of strategically positioning stitch clads that will prevent the adjacent crack from opening up.

Preferably, the combination of hammer peening and laser cladding will ensure sealing of the crack 42 with a single cladded metal layer. If necessary or desirable, build-up of the thickness of the cladded metal layer can be performed directly over the cladded metal layer due to the low dilution of a laser cladding process and the accurate control of process parameters.

In order to effect a successful seal of the crack 42 in the flange 40, the width of the metallic clad layer as well as the width of the clad beads 44 has to be optimised. If the clad layer is too wide, thermal stresses resulting from the solidifying weld metal will cause the crack 42 to widen. It is also essential that the viscosity of the melt pool 24 is sufficient to contain the water pressure. This is achieved by limiting the size of the melt pool 24 as well as ensuring a sufficiently high solidification rate.

In the event that leaking pores remain in the clad layer it has been found that these pores cannot be sealed simply by the application of successive clad layers. This problem is however addressed by the application of hammer peening to the pores followed by the application of a second clad layer. Again, an air hammer with a rounded steel tip is typically used. The clad layer is thus cold forged to close the pore and thus reduce the level of water leakage to the extent that a successful seal can be produced through the application of a second clad layer.

The invention provides a non-contact non-electrical process or method for repairing cracks and the like that may avoid possible electro-chemical effects during repair. Advantageously, the method of the invention can be used in the presence of water flowing over the cracked area, or in the presence of gas escaping from the crack and also in windy conditions. In contrast, conventional arc welding techniques require shielding of the melt pool against atmospheric contamination. Windy conditions can result in improper shielding of the melt pool causing oxidation and porosity formation in conventional arc welding processes.

The superior process control possible with laser cladding in combination with cold forging, e.g. hammer peening, enables in-situ repair of thin-walled water-filled stainless steel components. Arc welding procedures are not suitable for application in moist environments and also present an unacceptable risk of melt through perforation of thin walls. Advantageously, in-situ repair made possible by the method of the invention, as illustrated, in some instances eliminates the need to shut equipment down and can thus reduce downtime and the cost associated with lost production.

The invention claimed is:

1. A method of repairing a metallic artifact with an open defect in or on a metallic surface or substrate of the metallic artifact, the method including
    cold forging the open defect to close the open defect; and
    laser cladding the cold forged defect with a plurality of laser clad beads applied to the metallic surface or substrate to cover the cold forged defect with a cladded metal layer.

2. The method as claimed in claim 1, in which the metallic artifact is a steel or stainless steel artifact, and in which the metallic artifact is stationary and is repaired in situ without removing the metallic artifact from where it is located in use or without removing the metallic artifact from service.

3. The method as claimed in claim 1, in which the metallic artifact is a 304L stainless steel water-filled vessel or a component of such a vessel with the open defect being a stress corrosion induced crack in a wall of the vessel or in said component of the vessel.

4. The method as claimed in claim 1, in which the metallic artifact holds or carries a fluid behind the open defect during performance of the method, the fluid being at a pressure of more than 0.1 bar(g).

5. The method as claimed in claim 4, in which the fluid is at a pressure of between 1 bar(g) and 3 bar(g).

6. The method as claimed in claim 4, in which the laser cladding generates a melt pool, and in which the viscosity of the melt pool is made sufficiently high by limiting the size of the melt pool and by ensuring a sufficiently high solidification rate, to contain the fluid under pressure.

7. The method as claimed in claim 1, in which cold forging of the open defect is in the form of, or includes hammer peening of the open defect.

8. The method as claimed in claim 7, in which an air hammer with a rounded steel tip is used for the hammer peening.

9. The method as claimed in claim 1, in which the laser clad beads are parallel and overlapping thereby to form the cladded metal layer.

10. The method as claimed in claim 1, in which the chemical composition of the cladded metal is different from that of the metallic surface or substrate of the metallic artifact.

11. The method as claimed in claim 1, in which the defect is elongate, and in which the clad beads are applied transverse to a longitudinal axis or direction of the elongate defect.

12. The method as claimed in claim 1, in which the cladded metal layer covers the entire defect and extends beyond the limits of the defect, so that on all sides of the defect there is a zone where the cladded metal layer is between the defect and uncladded substrate.

13. The method as claimed in claim 1, in which the cladded metal layer still shows an open defect after laser cladding, the method including cold forging the open defect in the cladded metal layer which is a first cladded metal layer, and applying a further cladded metal layer by means of laser cladding over at least part of the first cladded metal layer.

14. The method as claimed in claim 1, in which laser clad beads are deposited at speeds that range between 0.3 m and 3 m per minute, with a bead overlay of 50% to 70%, to ensure that a continuous cladded metal layer is formed.

* * * * *

UNITED STATES PATENT AND TRADEMARK OFFICE
CERTIFICATE OF CORRECTION

| | | |
|---|---|---|
| PATENT NO. | : 8,322,008 B2 | Page 1 of 1 |
| APPLICATION NO. | : 13/140736 | |
| DATED | : December 4, 2012 | |
| INVENTOR(S) | : Corney Van Rooyen et al. | |

It is certified that error appears in the above-identified patent and that said Letters Patent is hereby corrected as shown below:

Title Page, item (57); in lines 1 and 3, of the Abstract, please amend "artefact" to read --artifact--.

Signed and Sealed this
Twelfth Day of February, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,322,008 B2  
APPLICATION NO. : 13/140736  
DATED : December 4, 2012  
INVENTOR(S) : Corney Van Rooyen et al.

Page 1 of 1

It is certified that error appears in the above-identified patent and that said Letters Patent is hereby corrected as shown below:

Title Page;

On the face of the patent, under item (73) Assignee, two entities should be listed instead of just one. Please replace section (73) Assignee on the face of the patent to read as follows:

(73) Assignee: Eskom Holdings Doc Ltd., Sandton, Guateng Province (ZA); and
CSIR, Pretoria, Guateng Province (ZA)

Signed and Sealed this
Twenty-sixth Day of February, 2013

Teresa Stanek Rea
*Acting Director of the United States Patent and Trademark Office*